United States Patent [19]
Stewart

[11] 3,736,661
[45] June 5, 1973

[54] SHEAR CONSTRUCTION

[76] Inventor: Charlie G. Stewart, P. O. Box 327, Birmingham, Ala. 35064

[22] Filed: Jan. 3, 1972

[21] Appl. No.: 214,863

Related U.S. Application Data

[63] Continuation-in-part of Ser. No. 872,615, Oct. 30, 1969, Pat. No. 3,638,307.

[52] U.S. Cl. .................................................30/192
[51] Int. Cl. ..............................................B26b 17/00
[58] Field of Search.......................30/190, 191, 192, 30/251, 252

[56] References Cited

UNITED STATES PATENTS

| | | | |
|---|---|---|---|
| 1,407,780 | 2/1922 | Bernard | 30/191 |
| 2,207,223 | 7/1940 | McGary | 30/251 |
| 2,528,815 | 11/1950 | Boyer | 30/251 X |

FOREIGN PATENTS OR APPLICATIONS

| | | | |
|---|---|---|---|
| 450,433 | 8/1948 | Canada | 30/190 |

Primary Examiner—Robert C. Riordon
Assistant Examiner—J. C. Peters
Attorney—Harvey B. Jacobson

[57] ABSTRACT

A pair of shears including relatively swingable jaws and relatively swingable levers. The jaws are pivotally connected for relative swinging about a first axis stationarily positioned relative to both jaws and the levers are also connected for relative swinging movement. The levers are further operatively connected to the jaws for relative swinging of the latter in response to swinging of the levers with the axis of relative swinging of the jaws shifting relative to both levers during relative swinging of the jaws.

2 Claims, 4 Drawing Figures

PATENTED JUN 5 1973　　3,736,661

SHEAR CONSTRUCTION

This application comprises a continuation-in-part of my co-pending U. S. application Ser. No. 872,615, filed Oct. 30, 1969, for cutting shears, now U.S. Pat. No. 3,638,307, dated Feb. 1, 1972.

The shears of the instant invention include a pair of relatively pivotal jaws and a pair of relatively swingable levers with the latter connected to the former in a manner such that a compound linkage is formed and final movement of the jaws of the shears toward their cutting positions requires a greater relative angular displacement of the levers of the shears than initial movement of the jaws to the closed positions. Thus, the shears have a built-in mechanical advantage which is brought into play as the cutting jaws approach their closed or cutting positions.

The shears are further constructed in a manner whereby they may be provided with relatively short pruning blades or relatively long blades such as those used in trimming hedges and the like. Further, the handle ends of the levers of the shears may be short for operation by a single hand of the user or the handle ends of the levers may be long so as to adopt the shears to be utilized by both hands of the user.

The main object of this invention is to provide a pair of shears wherein a novel compound linkage is provided between the relatively pivotal jaws of the shears and the relatively swingable lever handles of the shears.

Still another object of this invention is to provide a pair of shears in accordance with the preceding object and including compound linkage between the handles and the shear jaws which will function in a manner to increase the mechanical advantage of the lever handles on the shear jaws as the shear jaws move toward their cutting positions.

A still further object of this invention is to provide a pair of shears constructed in a manner whereby normal tolerances between relatively movable parts thereof will particularly well adapt the shears, when equipped with short blades, to utilize a single cutting blade and an anvil blade.

Another important object of this invention, in accordance with the immediately preceding object, is to provide a pair of shears whose cutting blade will automatically be moved into planar relationship with the cooperating anvil surface of the anvil blade, even when wear has occurred between the relatively movable parts of the shears.

A final object of this invention to be specifically enumerated herein is to provide a pair of shears which will conform to conventional forms in manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
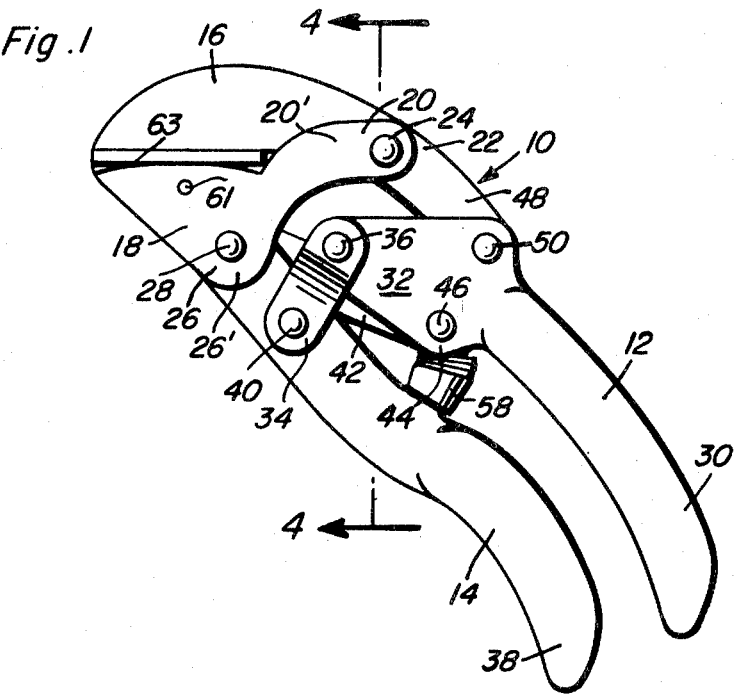
FIG. 1 is a side elevational view of the shears of the instant invention.
Figure 2:
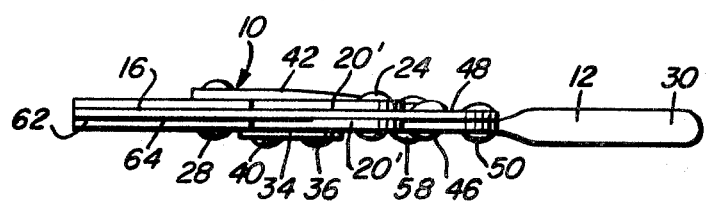
FIG. 2 is a top plan view of the assemblage illustrated in FIG. 1.

Referring now more specifically to the drawings, the shears of the instant invention are referred to in general by the reference numeral 10 and inlcude a pair of handle levers 12 and 14. The shears 10 also include a pair of blade portions or jaws 16 and 18 and the jaw 18 includes a bifurcated heel portion 20 between whose furcations 20' the mid or central portion 22 of the jaw 16 is pivotally secured by means of a pivot fastener 24. Also, the law 18 includes a lower bifurcated portion 26 between whose furcations 26' the adjacent end of the lever 14 is pivotally secured by means of a pivot fastener 28.

The lever 12 includes a handle end 30 and a nose end 32. The nose end 32 of the lever 12 is pivotally secured to a short off set connecting link 34 by means of a pivot fastener 36 and the opposite end of the link 34 is pivotally connected to the lever 14 a spaced distance toward the handle end 38 thereof from the fastener 28 by means of a fastener 40. In addition, a second bowed connecting link 42 has one end thereof pivotally connected to the bifurcated portion 26 and the adjacent end of the lever 14 by means of the pivot fastener 28 while the opposite end of the connecting link 42 is pivotally connected to a lower portion 44 of the nose end 32 of the lever 12 by means of a fastener 46. Also, the terminal end of the heel portion 48 of the jaw 16 is pivotally secured to an upper portion of the nose end of the lever 12 by means of a pivot fastener 50.

The levers 12 and 14 include opposing lug portions 54 and 56 over which the opposite ends of a compression spring 58 are telescoped and the spring 58 therefor serves to yieldingly bias the handle ends of the levers 12 and 14 apart and the jaws 16 and 18 away from each other. Further, it may be noted that the jaw 16 includes a straight sharpened edge 60 and that the jaw 18 is longitudinally slotted and has the vertical flange of an anvil 62 secured within the slot (not shown) by means of a pivot fastener 61, the upper edges 63 of the jaw 18 on opposite sides of the slot being convexly arcuate whereby the anvil 62 may rock slightly relative to the jaw 18, the latter including an anvil surface 64 with which the sharpened edge 60 cooperates when the jaws 16 and 18 are swung to their just opposed closed positions.

In operation, as the handle levers 12 and 14 are swung toward each other, the pivot fastener 50 exerts an upward thrust and rearward pull on the heel portion 48 of the jaw 16 and the pivot fastener exerts a forward and upward force on the jaw 18 whereby the jaws 16 and 18 are swung to the closed positions illustrated in FIG. 1.

Figure 3:
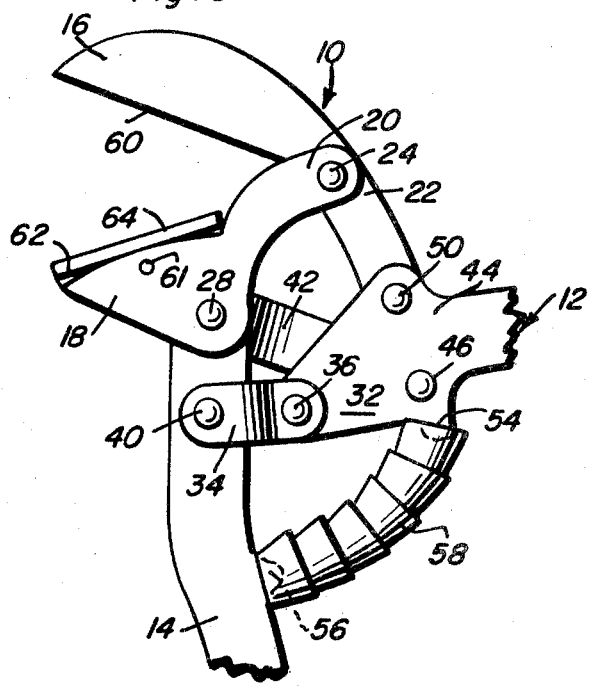
FIG. 3 is a fragmentary side elevational view of the shears with the lever handles and jaws of the shears in open positions and portions of the free ends of the lever handles being broken away.
Figure 4:
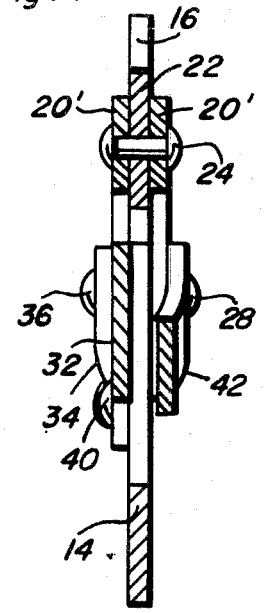
FIG. 4 is an enlarged sectional view taken substantially from the plane indicated by the sectional line 4—4 of FIG. 1.

It will be noted that the pivot fastener 24 is disposed closely adjacent the plane containing the pivot axes defined by the fasteners 36 and 40 when the jaws 16 and 18 are in their closed positions and it will be further noted that a line extending between the fasteners 28 and 46 is disposed at generally right angles to a line extending between the fasteners 24 and 40. Thus, the mechanical leverage of the handle levers 12 and 14 acting upon the jaws 16 and 18 approaches its maximum as the jaws 16 and 18 are swung to their closed positions. Further, each of the jaws 16 and 18 is also supported at two pivot points whereby it will be assured that the sharpened edge 60 will be coplanar with the anvil surface 64 when the jaws 16 and 18 are closed. It may also be noted from FIGS. 1 and 3 of the drawings that considerable leverage is provided by the levers 12 and 14 on the jaws 16 and 18 inasmuch as the pivot point 36 is disposed appreciably forward of the line connecting the pivot fasteners 46 and 50, thus giving a greater lift on the front end of the handle 14 from the handle 12 and aiding the brake dam on the rear end of the upper handle 12. In this respect, when the free ends of the handles 12 and 14 are urged together, pressure from the fastener 40 is directed upwardly on the link 34 and thus the fastener 36 tending to rotate the handle 12 in a clockwise direction so as to increase the downward pull of the fastener 50 on the heel portion 48. This in turn enables the fastener 46 to exert a forward thrust on the link 42 and thus a forward and upward thrust on the fastener 28 and lower jaw 18.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A pair of shears having first and second upper and lower jaws each including front and rear ends, said jaws including coacting opposing jaw edges for cutting objects therebetween as the jaws are swung toward closed positions, a pair of first and second upper and lower elongated levers having front and rear ends, the front end of said first lever being pivotally secured to the rear end of the first jaw for relative oscillation about a first transverse axis, the rear end of said second jaw being pivotally secured to the rear end of said first jaw for relative oscillation about a second transverse axis forward of said first axis, the front end of second lever being pivotally secured to the rear end portion of said second jaw for oscillation about a third transverse axis forward of said second axis, a first upright link pivotally secured at its upper end to the front end portion of said first lever for oscillation about a fourth transverse axis spaced forward and below said first axis and at its lower end to the front end portion of said second lever for oscillation about a fifth transverse axis spaced rearward of said third axis, and a second generally horizontal link pivotally secured at its rear end portion to said front end portion of said first lever for oscillation about a sixth transverse axis spaced rearwardly and below said fourth axis and at its forward end to said second jaw for oscillation about said third axis.

2. The combination of claim 1 wherein one of said jaws includes a straight sharpened edge extending therealong and opposing the other jaw, the other jaw including an anvil supported therefrom for limited oscillation about an axis generally paralleling the axis of relative pivotal movement of said jaws, said anvil including a generally planar anvil surface opposing said edge and disposed generally normal to the plane of relative swinging of said jaws and with which said edge is engageable along its length when said jaws are moved toward each other.

* * * * *